Nov. 3, 1931.    S. M. BÄCKSTRÖM    1,830,632
FREEZING THERMOSTAT
Filed Feb. 23, 1929
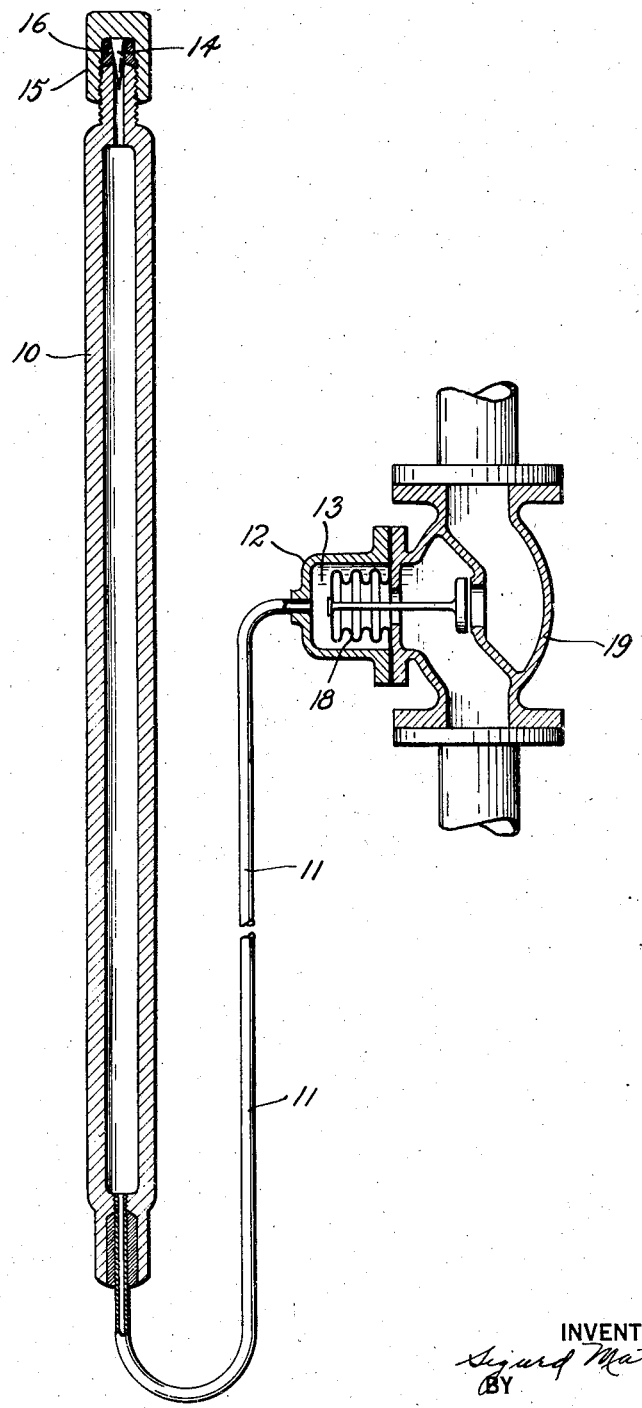
INVENTOR
Sigurd Mathias Bäckström
BY
his ATTORNEY Patented Nov. 3, 1931

1,830,632

UNITED STATES PATENT OFFICE

SIGURD MATTIAS BÄCKSTRÖM, OF STOCKHOLM, SWEDEN, ASSIGNOR TO PLATEN-MUNTERS REFRIGERATING SYSTEM AKTIEBOLAG, OF STOCKHOLM, SWEDEN, A CORPORATION OF SWEDEN

FREEZING THERMOSTAT

Application filed February 23, 1929, Serial No. 341,963, and in Sweden July 20, 1928.

The present invention relates to thermostats and particularly to thermostats wherein actuation is caused by expansion and contraction of a fluid. Still more particularly, the invention relates to that type of thermostat wherein the expansion and contraction of a substance due to freezing and melting is utilized to provide an initiating force. This type of thermostat I will refer to as a freezing thermostat.

Freezing thermostats have been previously proposed but attempts to reduce them to practice have not been successful to any great extent. Previously designed freezing thermostats have operated for some time but they do not last long enough for the type of service required of most thermostats. In many cases, the substance which expands, first freezes in the tube connecting the bulb of the thermostat with the operating mechanism forming an ice plug therein and confining a liquid quantity in the bulb, which liquid has no possibility to expand and therefore bursts the bulb or the tube on freezing.

I have found it possible to prevent the bursting of such thermostats by applying to the construction of the same a principle involving a characteristic of the substance used. I prefer water and will explain the invention with reference to water though it is to be understood that other fluids have the same characteristic. By explaining the invention in connection with water, the invention will be readily understood and the use of other fluids will be apparent.

If water is frozen at pressures above approximately 2115 kilograms per square centimeter, (approximately 30,000 lbs. per square inch) it does not expand. Below this critical pressure, water expands on freezing. However, as a matter of fact, above this critical pressure water contracts on freezing. The temperature at which water freezes at greater than 30,000 lbs. per square inch is minus 22° C. or minus 12° F.

I propose therefore to build the parts of the thermostat containing the freezing fluid which are capable of being cooled to the freezing temperature so that they will withstand pressures above 30,000 lbs. per square inch. Then the possibility of bursting is removed.

For purposes of illustration, a drawing accompanies this specification showing a preferred manner of carrying out the invention.

On the drawing, reference character 10 designates an elongated bulb of a thermostat designed for controlling a refrigerator. Connected to one end of bulb 10 is a tube 11, in turn connected to a valve mechanism 12. Within mechanism 12 is a bellows chamber 13. Bulb 10, tube 11 and chamber 13 are filled with water.

The device is filled through an opening in bulb 10 which is closed by conical plug 14 over which fits a cap 15. Cap 15 serves to force plug 14 into the filling passage. An easily fusible metal such as tin may be inserted at 16 to assure a tight joint. In filling the thermostat, it is important that air and other gases be entirely driven out so that it contains only water.

Bulb 10 and tube 11 are preferably made of steel and so strong as to withstand a pressure higher than the critical pressure mentioned, that is higher than 30,000 lbs. per square inch. In order to accomplish this, the construction illustrated has outside bulb and tube diameters twice the inside diameters. I prefer that the outside diameter be at least twice the inside diameter. Any suitable means may be used for securing tube 11 into the bulb.

On one side of bellows chamber 13 is a bellows 18. Movement of bellows 18 serves to vary flow through a valve 19. Valve 19 may, for example, control flow of gas to a gas burner serving to heat a refrigerator, such as the type known as Electrolux and as illustrated in U. S. Pat. No. 1,609,334, granted December 7, 1926, and U. S. Pat. No. 1,692,791, granted November 20, 1928. Instead of controlling a valve, bellows 18 may control an electric switch. Any suitable flexible member may be used in place of bellows 18, such as a substantially flat diaphragm. Valve 19 may control a flow of water, in turn controlling an electric switch or a gas valve. The showing of the valve mechanism is only diagrammatic as any number of valves are known which will serve the purpose intended.

In applying the thermostat to a refrigerator, bulb 10 is placed near or in contact with the evaporator of the refrigerating system. Preferably the bulb is arranged horizontally with the end closed by cap 15 in the coldest region. As much as possible of tube 11 is preferably placed outside the insulated food space and valve 19 and mechanism 12 is entirely outside the cold region. For this reason mechanism 12 need not be made to withstand the high pressure as freezing will not take place therein.

Obviously the invention is not limited to what is illustrated.

Having thus described my invention, what I claim is:

1. A freezing thermostat comprising an elongated hollow tubular member containing water. the wall thereof being made of metal of high tensile strength and of so great thickness as to withstand, without permanent deformation. the maximum pressure obtainable on the cooling down of water therein to a temperature at which freezing takes place without a simultaneous increase in volume.

2. A freezing thermostat bulb comprising a hollow steel cylindrical member of relatively great length to external diameter. the external diameter thereof being at least twice as great of the internal diameter thereof, said bulb being constructed to enclose water therein, the strength of the steel wall and the thickness thereof being so related as to permit pressures within the bulb in excess of 30.000 pounds per square inch without permanent deformation thereof.

3. A freezing thermostat comprising a hollow member containing a substance changeable between liquid and solid states in the range of temperature operation of the thermostat, the wall of said member being made of metal of high tensile strength and of so great thickness as to withstand, without permanent deformation, the maximum pressure obtainable on the cooling down of said substance to a temperature at which freezing thereof takes place without a simultaneous increase in volume.

4. A freezing thermostat comprising a hollow steel cylindrical member of relatively great length to external diameter and having reduced ends, the external diameter of said member being at least twice as great as the internal diameter, a cap closing one end of said member, and a conduit connected to the other end of said member, said member and said conduit containing water, and said conduit being made of steel and having its external diameter at least twice as great as its internal diameter, the strength of the steel walls of said member and said conduit and the thickness thereof being so related as to permit pressure therein in excess of 30,000 pounds per square inch without permanent deformation thereof.

In testimony whereof I have affixed my signature.

SIGURD MATTIAS BÄCKSTRÖM.